United States Patent
Liao et al.

(10) Patent No.: US 7,999,819 B2
(45) Date of Patent: Aug. 16, 2011

(54) SYSTEMS AND METHODS FOR MANAGING TEXTURE DESCRIPTORS IN A SHARED TEXTURE ENGINE

(75) Inventors: Fred Liao, San Jose, CA (US); Yijung Su, Alviso, CA (US); Yiping Chen, San Jose, CA (US); Mark Zheng, San Jose, CA (US)

(73) Assignee: Via Technologies, Inc., Taipei (TW)

( * ) Notice: Subject to any disclaimer, the term of this patent is extended or adjusted under 35 U.S.C. 154(b) by 938 days.

(21) Appl. No.: 11/943,071

(22) Filed: Nov. 20, 2007

(65) Prior Publication Data

US 2009/0128575 A1    May 21, 2009

(51) Int. Cl.
*G06T 11/40* (2006.01)
*G06F 13/00* (2006.01)
*G06F 12/02* (2006.01)

(52) U.S. Cl. .................. 345/552; 345/538; 345/565

(58) Field of Classification Search .................. 345/426, 345/530, 536–538, 552, 557, 559, 565, 572
See application file for complete search history.

(56) References Cited

U.S. PATENT DOCUMENTS

| | | | | |
|---|---|---|---|---|
| 5,828,382 A | * | 10/1998 | Wilde | 345/552 |
| 7,589,741 B1 | * | 9/2009 | Donham et al. | 345/582 |
| 2005/0179693 A1 | * | 8/2005 | Fu et al. | 345/557 |

* cited by examiner

*Primary Examiner* — Joni Hsu
(74) *Attorney, Agent, or Firm* — Thomas, Kayden, Horstemeyer & Risley, LLP

(57) ABSTRACT

Provided are methods for managing texture data. The methods include preloading a first plurality of texture descriptor values from a memory location in a first buffer located in a first logic block, wherein the first buffer is further configured to receive data corresponding to non-texture functions performed in the first logic block and preloading the first plurality of texture descriptor values from a memory location into a second buffer in a second logic block if the first buffer is full. The methods further include utilizing the first plurality of texture descriptor values, within the second logic block, to perform a shader calculation, and loading, dynamically, a second plurality of texture descriptor values from memory into the first buffer, wherein the first logic block requires additional data. Additionally, the methods can include writing, if the first buffer is full, the second plurality of texture descriptor values over a portion of the first plurality of texture descriptor values.

9 Claims, 10 Drawing Sheets

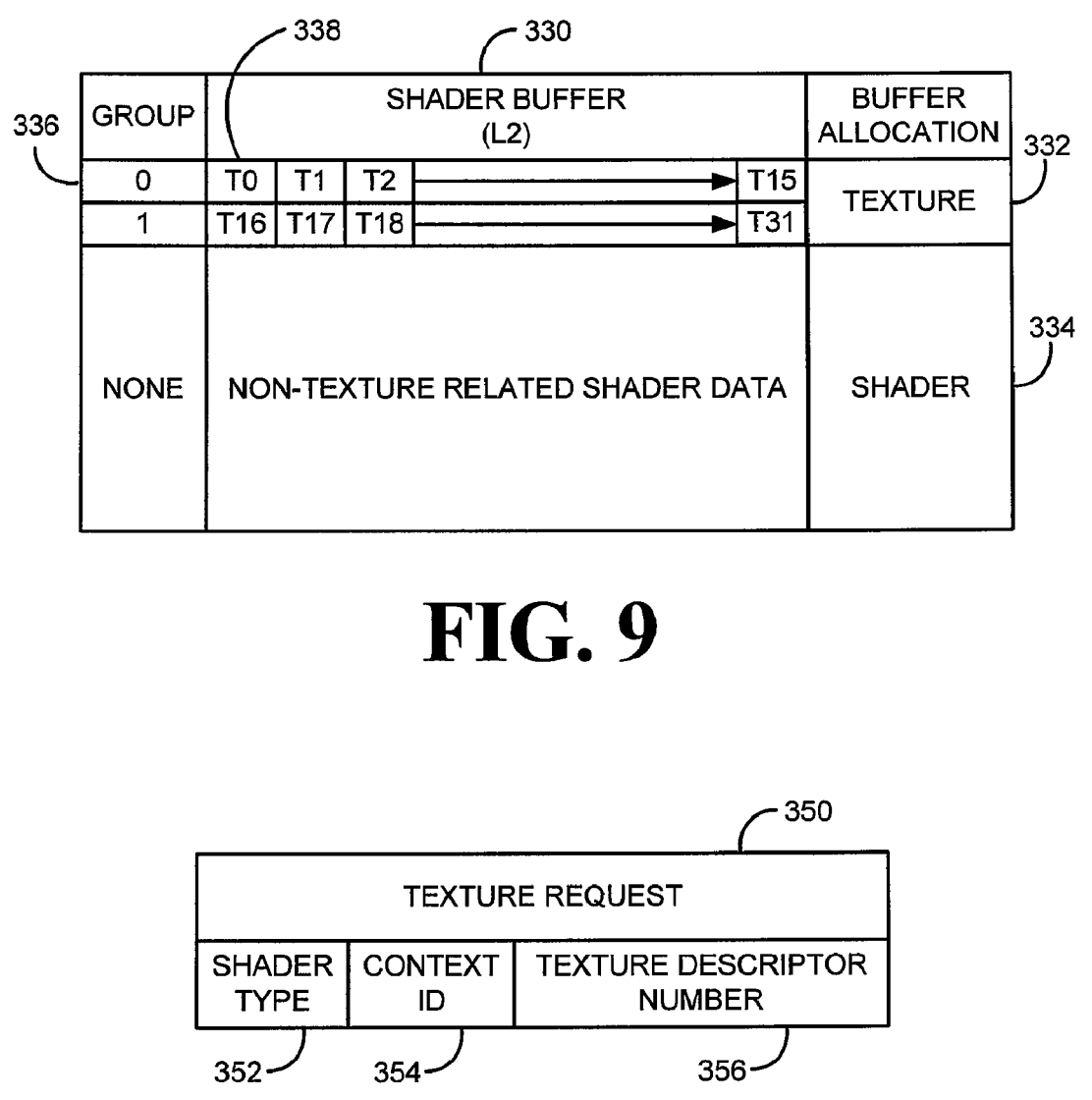

| GROUP | SHADER BUFFER (L2) | | | | | | BUFFER ALLOCATION |
|---|---|---|---|---|---|---|---|
| 0 | T0 | T1 | T2 | → | | T15 | TEXTURE |
| 1 | T16 | T17 | T18 | → | | T31 | |
| NONE | NON-TEXTURE RELATED SHADER DATA | | | | | | SHADER |

FIG. 9

| TEXTURE REQUEST | | |
|---|---|---|
| SHADER TYPE | CONTEXT ID | TEXTURE DESCRIPTOR NUMBER |

FIG. 10

| TEXTURE DESCRIPTOR ADDRESS VALUE 370 |||||||
|---|---|---|---|---|---|---|
| SHADER TYPE  372 | CONTEXT QUANTITY  374 | GROUP IDENTIFICATION  376 | VALID BIT  380 | BASE ADDRESS 378 |||
| ^ | ^ | ^ | ^ | GROUP VIRTUAL ADDRESS 3382 |||
| ^ | ^ | ^ | ^ | STARTING NUMBER  384 | OFFSET VALUE  386 ||

SYSTEMS AND METHODS FOR MANAGING TEXTURE DESCRIPTORS IN A SHARED TEXTURE ENGINE

CROSS-REFERENCE TO RELATED APPLICATIONS

This application is related to co-pending application Ser. No. 11/852,354 filed Sep. 10, 2007.

TECHNICAL FIELD

The present disclosure is generally related to computer processing and, more particularly, is related to systems and methods for managing texture data using a shared texture engine in a graphics processing unit (GPU).

BACKGROUND

In modern computer graphics processors, texture processing is one of the key components of the processing. Texture processing can include many different types of texture mapping techniques including cubic mapping, mipmapping, and anisotropic mapping among others. Multiple textures can be applied to the objects in both static and dynamic modes, which assume texture prefetch before shader program execution as well as dependent texture loading during shader execution. The complexity and volume of logical and arithmetic operations required to perform texture processing necessitate the use of dedicated circuits in addition to those utilized in other graphics processing operations. Accordingly, these dedicated texture processing circuits can consist of a significant percentage of the hardware gates that make up a graphics processing unit.

In addition to texture processing, graphics processors also include logic to perform several types of shader processing operations. For example, shader processing operations can be performed by vertex shaders, geometry shaders, and pixel shaders. In general, the shaders will require texture mapping service from the texture processing hardware at various stages of shader processing. For example, some shader operations can benefit from the efficiency improvement gained by preloading, also referred to as prefetching, texture data before shader execution. Preload texturing or static texturing can be especially beneficial in pixel shading operations where the texture processing requirements can be reliably predicted before shading operations. Alternatively, other shader operations require the texture data to be processed during the shader execution for a particular graphic element has commenced. Texture processing that is requested by the shader is referred to as dependent read texturing or dynamic texture loading and can be required more frequently in vertex and geometry shader operations as well as in some pixel shader operations. Another complication comes from multiple different objects requiring processing in parallel shaders. The multiple objects may require different sets of textures or different texture contexts, which are defined by texture descriptors containing information including, for example, location, type, and processing requirements, among others. The texture data includes the associated descriptors, for defining memory location, format, and other critical information related to the processing of texture data in a graphics pipeline.

Management of the texture descriptors in a complex texture processing environment is a non-trivial task and requires significant specialized resources. Since providing exclusive texture processing hardware to address each of the preload and dependent read texturing requirements creates an unwanted level of redundancy and can be costly in terms of processor hardware, methods and systems for sharing texture processing hardware are needed. Thus, a heretofore-unaddressed need exists in the industry for improved texture processing operations.

SUMMARY

Embodiments of the present disclosure provide systems and methods for managing texture data. Briefly described, in architecture, one embodiment of the system, among others, can be implemented as follows. The system comprises: a first logic block, within a graphics pipeline, the first logic block configured to perform texture processing; a first buffer within the first logic block, the first buffer configured to receive a first preloaded portion of a plurality texture descriptor values; a second logic block, within the graphics pipeline, the second logic block configured to perform shader operations; a second buffer in the second logic block, the second buffer configured to receive a second preloaded portion of the plurality of texture descriptor values in response to the first buffer is full from the plurality of texture descriptor values; texture buffer logic, configured to manage texture descriptor data corresponding to a plurality of contexts; and prefetch buffer logic configured to store prefetch texture descriptors in special registers.

Embodiments of the present disclosure can also be viewed as providing methods for managing texture data. In this regard, one embodiment of such a method can be broadly summarized as: preloading a first plurality of texture descriptor values from a memory location in a first buffer located in a first logic block, wherein the first buffer is configured to receive data in the first logic block; preloading the first plurality of texture descriptor values from a memory location into a second buffer in a second logic block in response to the first buffer is full; utilizing the first plurality of texture descriptor values, within the second logic block, to perform a shader calculation; loading, dynamically, a second plurality of texture descriptor values from memory into the first buffer in response to the first logic block requires additional data; and writing, in response to the first buffer is full, the second plurality of texture descriptor values over a portion of the first plurality of texture descriptor values.

Embodiments of the present disclosure can further be viewed as providing methods for managing texture data. In this regard, one embodiment of such a method, among others, can be broadly summarized by the following steps: preloading a plurality of texture descriptor values into a first buffer before executing logical functions within a shader logic block; and reading an unloaded texture descriptor data value into a second buffer from a memory block if the shader logic block is dependent on the unloaded data value.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 9 is a block diagram illustrating an exemplary embodiment of an L2 descriptor buffer as a partition of an L2 common cache.

FIG. 10 is a block diagram illustrating an exemplary embodiment of a format for a texture request.

DETAILED DESCRIPTION

Figure 1:
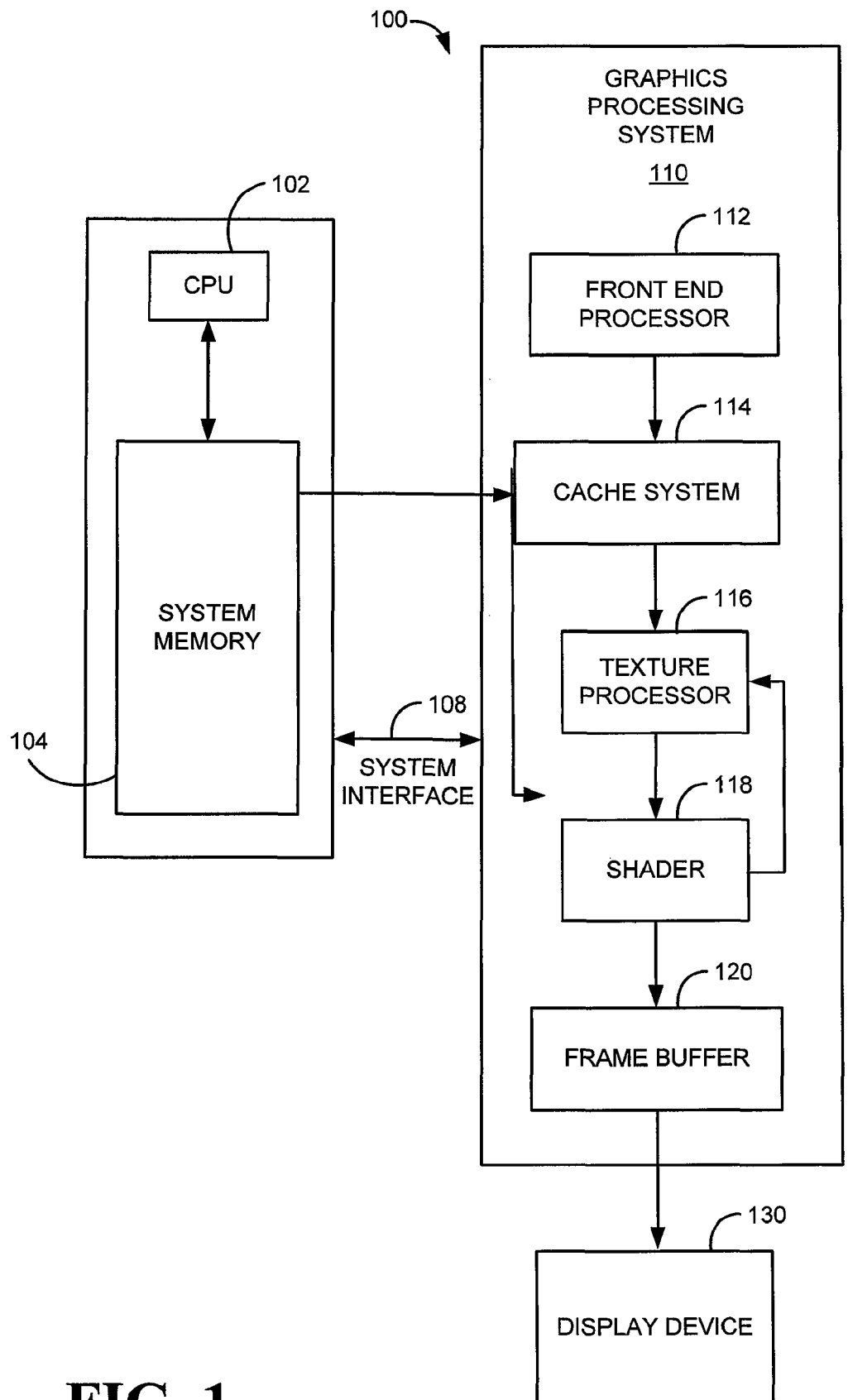
FIG. 1 is block diagram illustrating an exemplary computer system that utilizes the systems and methods disclosed herein.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Reference is now made to FIG. 1, which is a block diagram illustrating an exemplary computer system that utilizes the systems and methods disclosed herein. The computer system 100 includes a CPU 102, a system memory 104, and a graphics processing system 110. A CPU 102 performs various functions, including determining information, such as, for example, a view point location allowing for the generation of graphic displays. The system memory 104 stores a variety of a data, including graphic display data such as multiple texture maps and texture descriptors. The graphics processing system 110, based on information determined by the CPU 102 and the data stored in the system memory 104, generates display data for a display device 130, such as, for example, a monitor.

The CPU 102 provides requests to the graphics processing system 110 over a system interface 108, including requests to process and display graphics information. Graphics requests from the CPU 102 are received by the graphics processing system 110 and provided to a front end processor 112. The front end processor 112 generates a pixel stream containing pixel coordinates concomitant to the display device 130. Information relating to the pixel coordinates generated by the front end processor 112 is provided to a texture processor 116 utilizing a cache system 114. The cache system 114 provides the data preload from memory and short-term data storage for the data necessary to perform the texture processing and the shader operations. The data can be stored based on operations where the data is preloaded in anticipation of new requirements of future operations within the texture processor 116, or the data can be retrieved from the system memory 104 into the cache system 114 based on specific requests from the texture processor 116. The cache system 114 may contain a variety of memory buffers including, but not limited to, texture descriptor buffers, a texture data cache, a depth cache, and a pixel cache, among others.

In addition to storing data for the texture processor 116, the cache system 114 also stores data for the shader 118. Although referred to in this figure in the singular, the shader 118 can be any one of a vertex shader, a pixel shader, or a geometry shader. Further, the shader 118 can, and typically does, include multiple shader execution units configured to process a plurality of graphics threads in parallel. The shader 118 may perform various transformations on the graphics vertices, geometry and pixel data. In this regard, the data may be transformed from world coordinates to model view coordinates, and to projection coordinates, and ultimately into screen coordinates. Additionally, primitives such as triangle can be processed, replicated, or tessellated. In the is regard, a pixel shader can be used to process pixel values. The functional processing performed by the shader 118 is known and need not be described further herein. Thereafter, the graphics data may be passed on to the frame buffer 120, which is used to generate a display on a display device 130.

Figure 2:
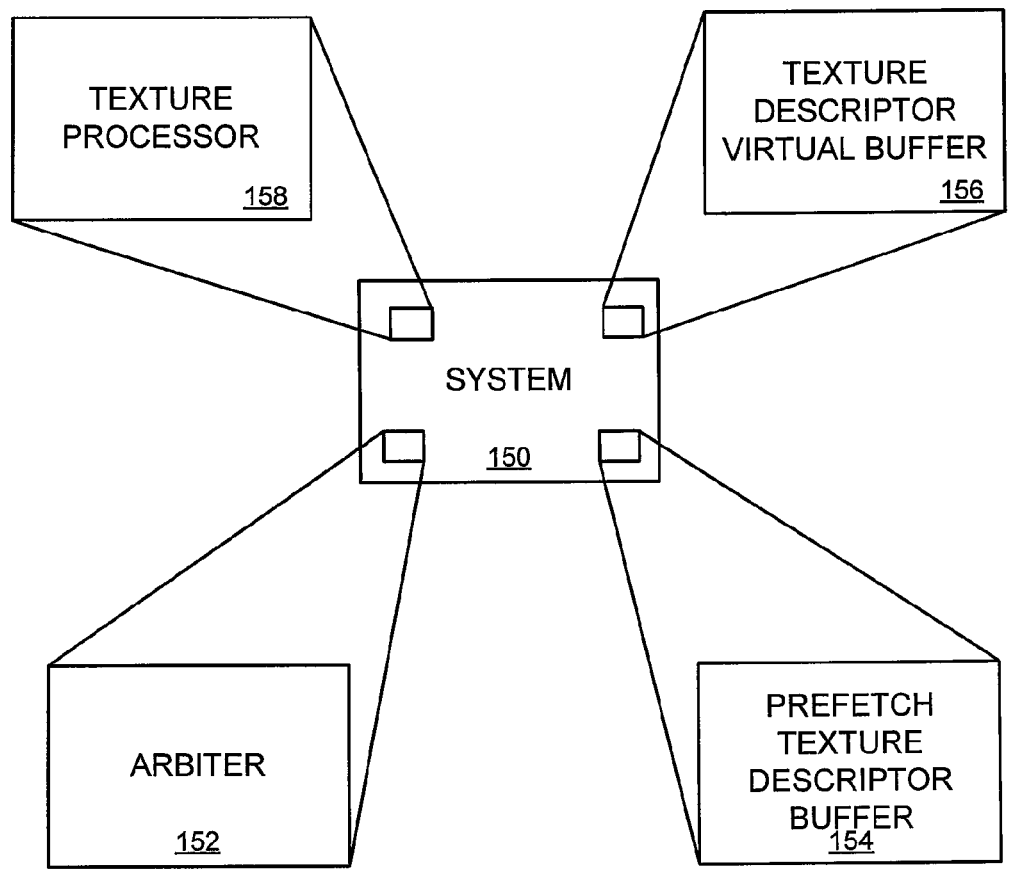
FIG. 2 is a block diagram illustrating an embodiment of a system for managing texture descriptor data.

Reference is now made to FIG. 2, which is a block diagram illustrating an embodiment of a system for managing texture data. The system 150 includes an arbiter 152, that is configured to select between a dependent texture read request and a preload texture read request for services of a texture processor 158. The texture processor 158 performs texture data fetch and related calculations including, but not limited to, texture filter operations, bilinear filtering, trilinear filtering, and anisotropic filtering. A prefetch texture descriptor buffer 154 is utilized to temporarily store texture descriptor data to be used by a texture processor for preload texture data fetch and processing. Texture descriptors are discrete segments of data that include the necessary information for performing texture fetch and processing on a particular graphics element. In this context, a graphics element can be, for example, a pixel, a vertex, or a geometric primitive.

The system 150 also includes a texture descriptor virtual buffer 156, which is typically greater than that of the prefetch texture descriptor buffer 154. Virtual buffer 156 may contain texture descriptors, which are used during shader program execution to fetch required texture. Implementation of the virtual buffer may be accomplished using a variety of techniques including, but not limited to, multilevel memory utilizing an L1 buffer and an L2 backup cache.

Figure 3:
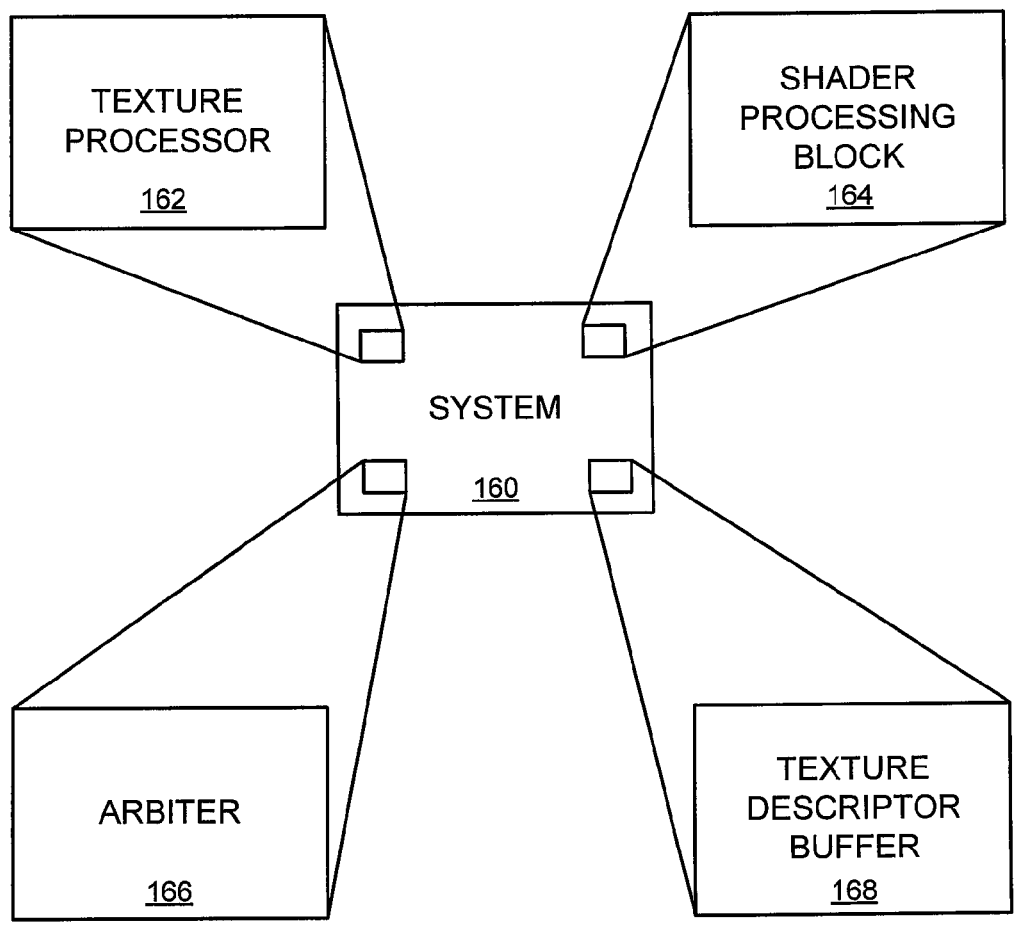
FIG. 3 is a block diagram illustrating an alternative embodiment of a system for managing texture data.

Reference is now made to FIG. 3, which is a block diagram illustrating an alternative embodiment of a system for managing texture data flow. The system 160 includes a texture processor 162 configured to perform texture processing operations, such as texture data fetch and texture filtering. The system 160 also includes a shader processing block 164 configured to perform shading operations for the computer graphics element. The shader processing block 164 can be configured, for example, as a pixel shader, a vertex shader, or a geometry shader, depending on which of the graphics elements is being processed. In some cases, the system 160 can process preloaded texture data in the texture processor 162 to further improve the performance of the system 160. In this manner, the processing on the preloaded texture data is performed before shader processing is performed on the same graphics element. Alternatively, texture processing may be required on graphics elements during or after shader processing operations have been performed. In this circumstance, a request for texture service made of the texture processor 162 is a request for a dependent read operation. In the circumstance where both a preload request and a dependent read request are made, the arbiter 166 determines which of these requests are granted. Where the arbiter 166 grants a preload request, the preload texture data is fetched and processed in the texture processor 162 using texture descriptors from the texture descriptor buffer 168, which also may be available to the shader processing block 164. Alternatively, when the arbiter 166 grants a dependent read request, the processed dependent read texture data is fetched using texture descriptors and transmitted back to the shader processing block 164. The shader processing block 164 can include, for example, a shader register buffer for receiving the processed both preload (prefetch) and dependent read texture data. The shader register buffer may also be utilized to receive and store data that is unrelated to texture processing.

Figure 4:
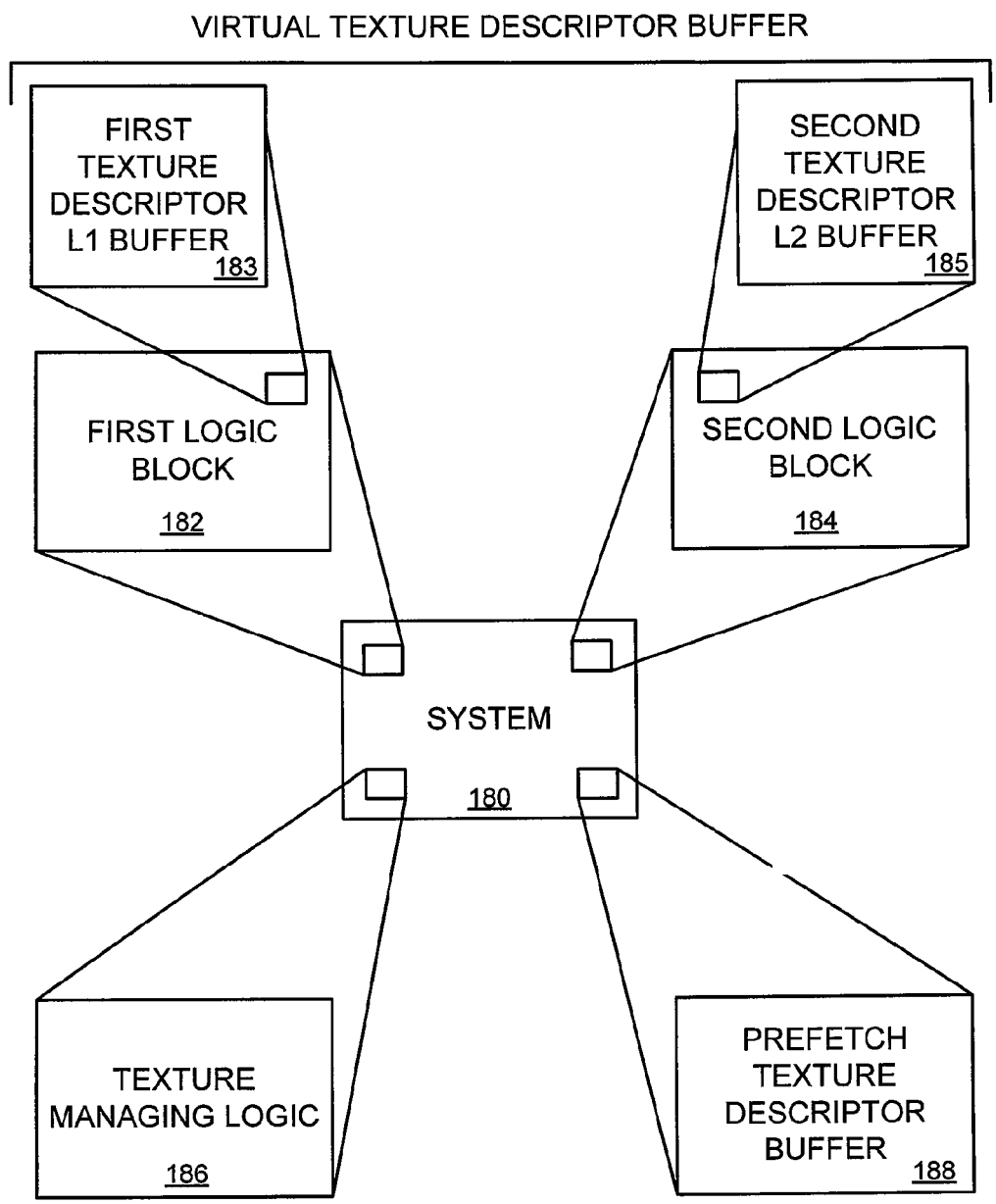
FIG. 4 is a block diagram illustrating another alternative embodiment of a system for managing texture data.

Reference is now made to FIG. 4, which is a block diagram illustrating another alternative embodiment of a system for managing texture data. A system 180 includes a prefetch texture descriptor buffer 188 configured to store prefetch texture descriptors in special registers. The system 180 further includes a first logic block 182, where the first logic block 182 includes a first texture descriptor L1 buffer 183. The first logic block 182 can be configured to perform texture processing and the first texture descriptor buffer 183 can be configured to receive a portion of preloaded texture descriptor values, which can optionally be used for a dependent texture fetch during shader execution. The system 180 further includes a second logic block 184, which includes a second texture descriptor L2 buffer 185. The second texture descriptor L2 buffer is also configured to receive a portion of preloaded texture descriptor data values for shader dependent texture reads in the case when L1 lacks the capacity or if the texture descriptors are related to a different context to be processed later. The capacities of the first texture descriptor L1 buffer 183 and a portion of the second texture descriptor L2 buffer 185 allocated for texture descriptors can be combined to create a virtual texture descriptor buffer. The system 180 also includes texture managing logic 186 that is configured to manage texture descriptor data corresponding to multiple contexts. For example, the texture managing logic 186 can be utilized to coordinate the communications between the first texture descriptor L1 buffer 183 and the second texture descriptor L2 buffer 185. Additionally, the texture managing logic 186 can be utilized to determine the functional relationship between the first texture descriptor L1 buffer 183, the second texture descriptor L2 buffer 185, to establish the virtual buffer for texture descriptors.

Figure 5:
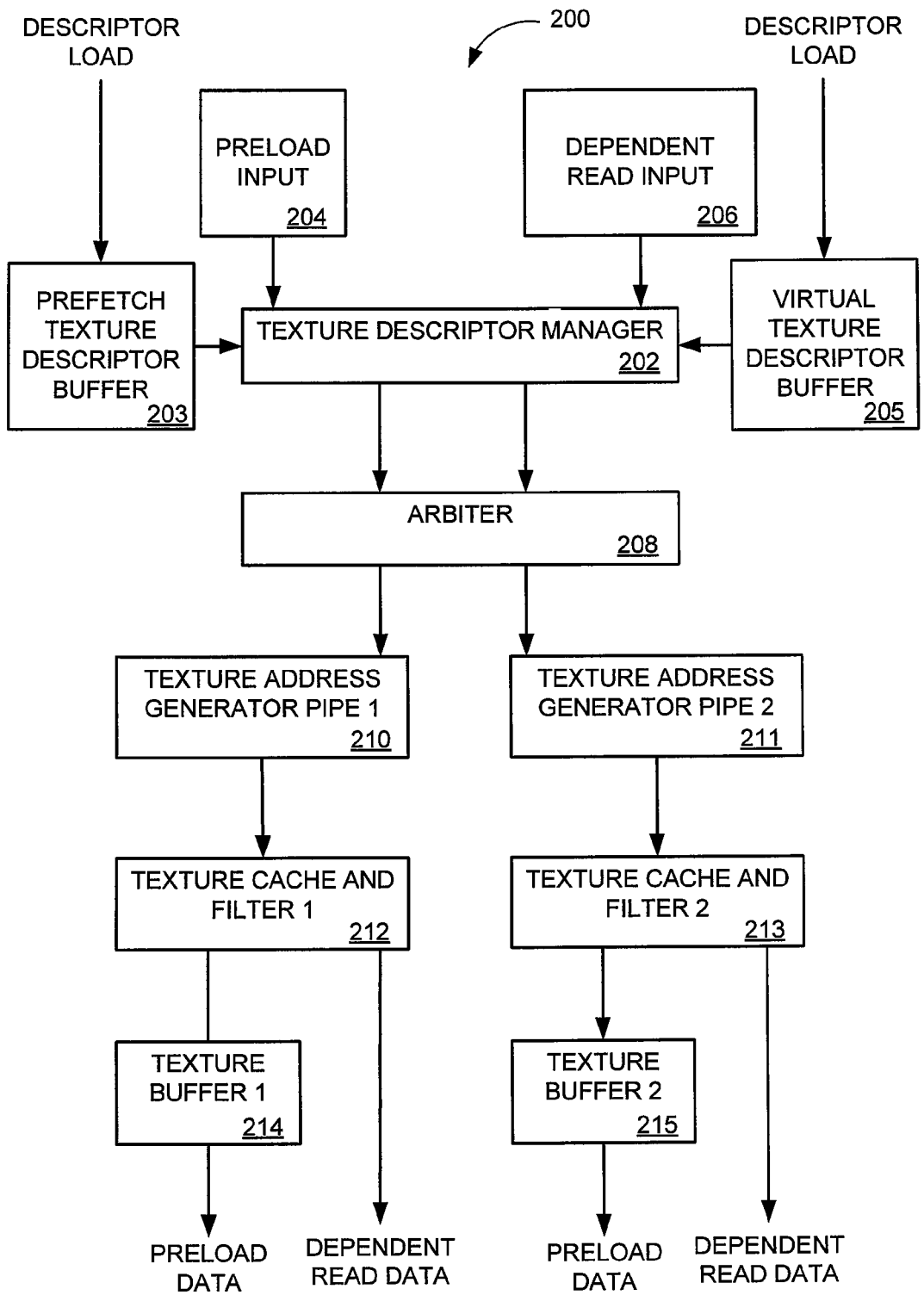
FIG. 5 is a block diagram of a top level illustration a system for managing texture data.

Reference is now made to FIG. 5, which is a block diagram of a top level illustration of a system for managing texture data. The system 200 receives texture requests for a preload input 204 or a dependent read request input 206. The request for the preload input 204 comes from the rasterizer and the request for the dependent read input 206 is made by the shader. A texture descriptor manager 202 receives the texture descriptor data associated with the preload input 204 and the dependent read input 206 from the prefetch texture descriptor buffer 203 and virtual texture descriptor buffer 205, respectively. When the data from either of the two sources is complete, a texture request is sent to the arbiter 208. An arbiter 208 will select either the dependent read request or the preload data request when that data is available from the texture descriptor manager 202. The texture data corresponding to the selected request is then forwarded to a texture address generator pipeline 210, 211.

As illustrated, the system 200 of some embodiments includes multiple texture processing pipelines. The texture address generators 210, 211 can calculate a texture address using any one of a number of texture mapping techniques in combination with information provided in texture descriptors. The texture request data is then sent to a texture cache and filter 212, 213 for a texture value calculation that results in the final texture color.

When the arbiter 208 grants the request corresponding to the preload input 204, the result of the texture processing is stored in the texture buffer 214, 215. Alternatively, where the texture request corresponding to the dependent read input 206 is granted by the arbiter 208, the result of the texture processing is immediately forwarded to the shader through a register buffer configured to support the shader stage, such as a pixel shader, a vertex shader, or a geometry shader.

Figure 6:
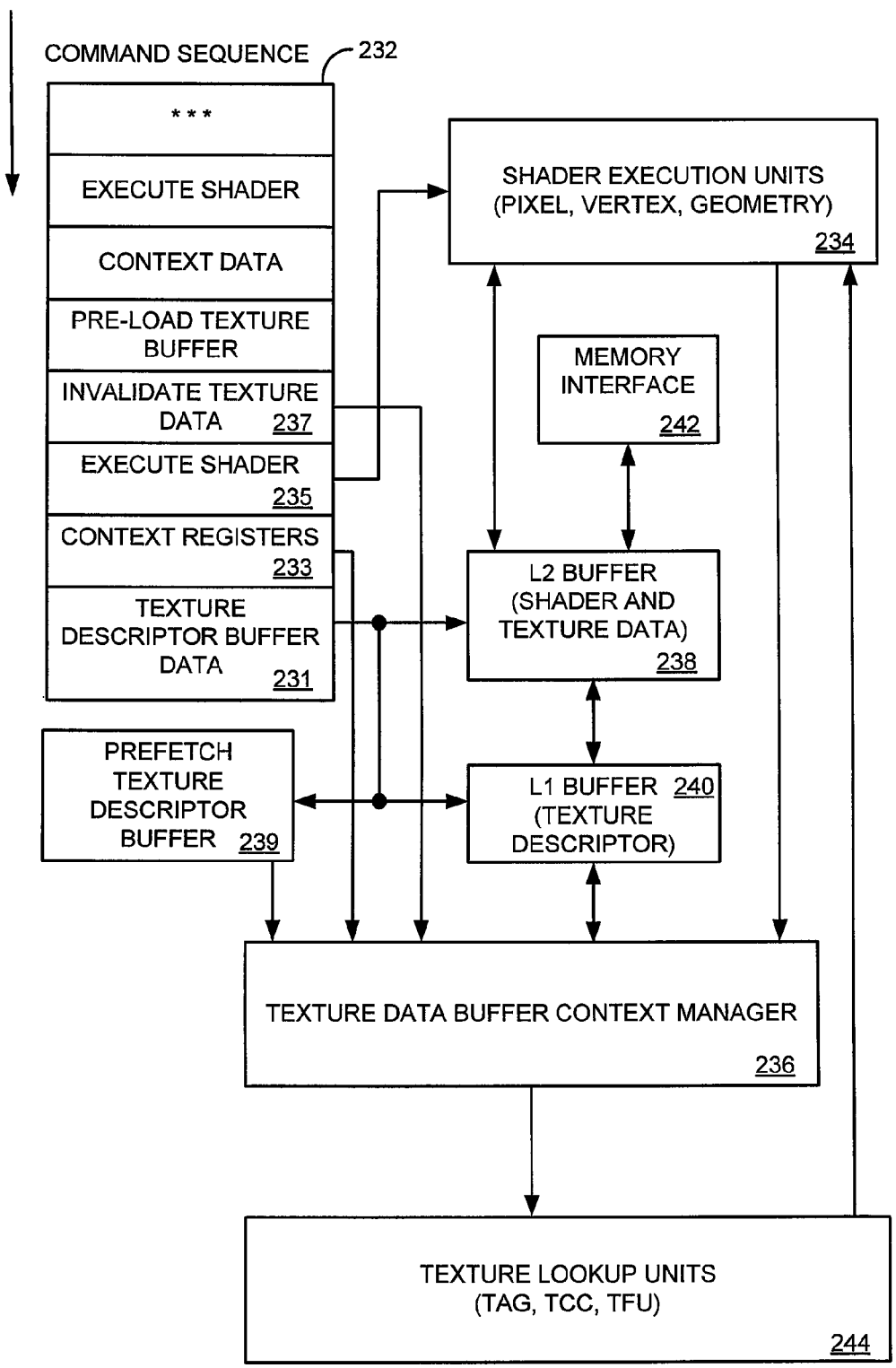
FIG. 6 is a block diagram illustrating a texture data flow chart as utilized in the systems and methods disclosed herein.

Reference is now made to FIG. 6, which is a block diagram illustrating a texture data flow chart as utilized in the systems and methods disclosed herein. A graphics processing unit driver (not shown) issues a sequence of commands 232, one of which includes the texture descriptor buffer data 231. The texture descriptor buffer data 231 causes texture descriptor data to be moved into the prefetch texture descriptor buffer 239, the L1 texture descriptor buffer 240, or the L2 buffer 238, depending on the designation of the command. As the preloaded texture descriptor data moves to the top of the L1 buffer 240, that data is also transferred to the L2 buffer 238, which is implemented as a partition of an L2 common cache and utilized by the shader execution unit to store shader related data, including but not limited to, texture descriptor data. When the shader execution unit 234 requires the texture descriptor data and that data is not available in the L1 buffer, the data is retrieved from the L2 buffer 238. In some embodiments, the texture descriptor data can be moved into either of the L1 buffer 240 or the L2 buffer 238 and then a hit test can be performed on the buffers to determine if the requisite data is available. In the case where the L2 buffer and the L1 buffer lack the requisite data for the upcoming shader operation, the data is retrieved from memory through a memory interface 242.

When the texture descriptor data is moved into the L1 buffer 240, address and identification data relative to the texture data is generated and managed within the texture data buffer context manager 236. In this way, the texture data can be tracked and managed for multiple contexts simultaneously. Texture descriptor data is also transmitted to the texture look-up units 244, which perform the actual texture address generation, texture cache control, texture fetch, and texture filtering corresponding to the texture unit. The preloaded texture descriptor data is consumed within the texture unit to fetch and filter texture data before the shader execution unit to prevent latency of the texture data loading from memory. In certain cases, however, when the L2 buffer resources are heavily utilized for other shader operations, the preloading of texture descriptor data into the L2 buffer may be performed on a reduced basis, if at all.

The context register command 233 communicates with the texture data buffer context manager 236 to update the information relative to the different contexts being processed. The execute shader command 235 directs the shader execution units 234 to perform shader operations. The status of the data consumed or utilized in the shader execution unit 234 during the shader operations is communicated to the texture data buffer context manager 236 to fetch required descriptors and update the status of texture descriptor data.

An invalidate texture data command 237 communicates to the texture data context manager 236 that a particular texture descriptor is no longer valid and can be trashed or overwritten. In the case where the shader execution units 234 request data that is unavailable in either of the L2 buffer 238 or the L1 buffer 240, a texture descriptor loaded through the memory interface 242 can be utilized to replace an existing buffer entry based on a least recently used scheme. The invalidate texture data command 237 can also be utilized to remove lines of texture descriptors that may conflict with texture descriptor data required in a subsequent shader operation. The invalidation, however, is not always necessary where the texture descriptors of two different contexts do not conflict. In this manner, the L1 buffer can include multiple context texture descriptors for concurrent execution of the different contexts.

Figure 7:
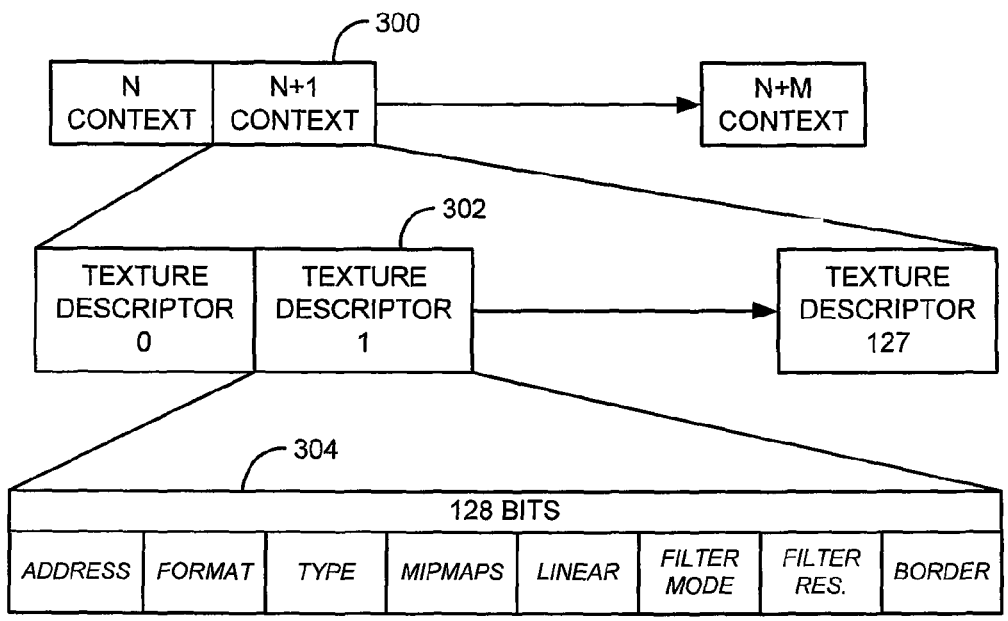
FIG. 7 is a block diagram illustrating an embodiment of a texture descriptor as a part of a graphics context utilized in the systems and methods herein.

Reference is now made to FIG. 7, which is a block diagram illustrating an embodiment of a texture descriptor data format as utilized in the systems and methods herein. As illustrated, each of the independent graphics contexts 300 include, for example, 128 texture descriptors 302. Additionally, each of the texture descriptors 302 can include, for example, 128 bits of texture information. The texture information can include, but is not limited to, virtual or physical address, texture format, texture construction type, quantity of mipmaps, linear modality, dimensional information, filter mode, filter resolution, gamma correction, texture border data, and compression data among others.

Figure 8:
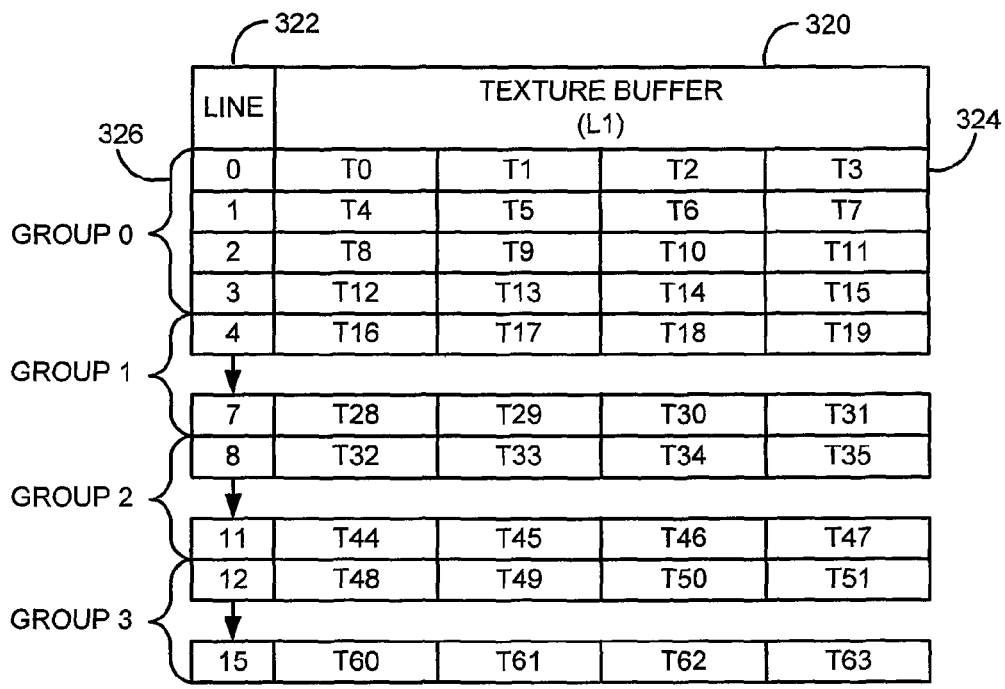
FIG. 8 is a block diagram illustrating an exemplary embodiment of a texture descriptor L1 buffer.

Reference is now made to FIG. 8, which is a block diagram illustrating an exemplary embodiment of a texture descriptor buffer. The texture descriptor L1 buffer, L1 320 of an embodiment can include 16 lines 322 where each line is capable of storing four texture descriptors 324. In this manner, every four lines in the texture buffer 320 can be configured to form a group 326 such that each group includes 16 texture descriptors 324. Thus, group 0 includes texture descriptors T0-T15, group 1 includes T16-T31, group 2 includes texture descriptors T32-T47, and group 3 includes texture descriptors T48-T63. In this manner, when the texture data is transferred from the texture buffer 320 to an L2 buffer 330 (a partition of the L2 common L2 cache) as depicted in FIG. 9, which is a block diagram illustrating an exemplary embodiment of an L2 common cache, each line of the L2 common cache 330 can store all of the texture descriptors in a group 336. Note that the shader buffer 330 includes a buffer allocation for texture descriptor data 332 and a buffer allocation for other non-texture related shader data 334. One of ordinary skill in the art will know or appreciate that the formats and buffer dimensions illustrated in the above FIGS. 7-9 are presented for exemplary purposes only and are not intended to limit the scope or spirit of the disclosure in any way. For example, a context 300 could include more or less than 128 texture descriptors 302. Similarly, the texture buffer 320 could have more or less than 16 lines 322, each having more or less than four texture descriptors.

Reference is now made to FIG. 10, which is a block diagram illustrating an exemplary embodiment of a format for a texture request. Since the texture request 350 can correspond to texture service for a pixel shader, a vertex shader, or a geometry shader, the shader type field 352 is included in the texture request. Similarly, since the texture request can also correspond to any one of multiple contexts, a context ID field 354 is included to identify the context for which the request is made. In addition, the texture request 350 also includes a texture descriptor number 356. The texture descriptor number 356 is used by a texture address generator to look up a virtual address in the system registers and generate a texture address for the texture data prefetch and dependent texture read buffers.

Figures 11, 12:
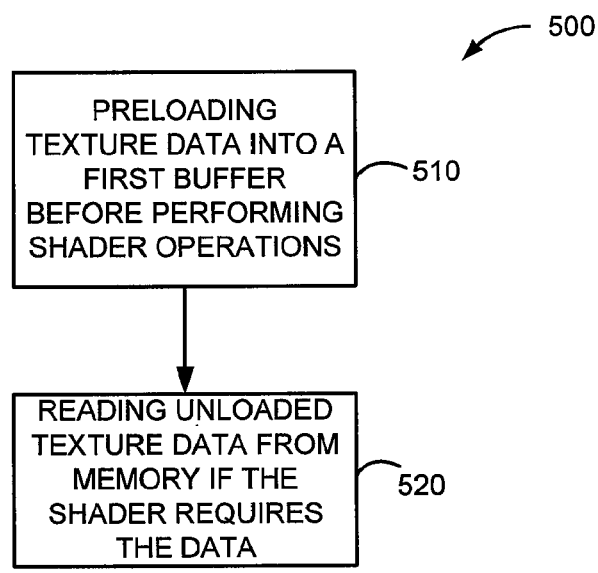
FIG. 11 is a block diagram illustrating an exemplary embodiment of a format for a texture descriptor.
FIG. 12 is a block diagram illustrating an embodiment of a method of managing texture descriptor data.

The texture descriptor data format 370 as illustrated in an exemplary embodiment in the block diagram of FIG. 11 includes a shader type field 372. A texture descriptor data 370 also includes a context quantity 374 and group identification 376. Additionally, the texture descriptor data 370 includes a base address 378, which can include a valid bit 380 and a group virtual address 382. A group virtual address can further be defined by a starting number 384 coupled with an offset value 386.

Reference is now made to FIG. 12, which is a block diagram illustrating an embodiment of a method of managing texture data. The method 500, as illustrated in block 510, begins with preloading texture descriptor data into a first texture descriptor L1 buffer before performing shader operations. In this manner, the texture data is processed and made available to a shader for subsequent processing based on the predicted requirements of the shader in future operations. By preloading the texture descriptor data, latency associated with fetching required data from memory is reduced and performance is thus improved. The method also includes, in block 520, reading unloaded texture data from memory if the shader requires the dependent texture data for ongoing operations. This operation is utilized after the shader has performed processing on the particular graphics element. In some circumstances the shader is performing a dependent read seeking additional data before a particular shader operation can be completed. For this reason, shader processing that utilizes a dependent read necessarily requires a greater number of clock cycles than a similar shader process that utilizes preloaded data.

Figure 13:
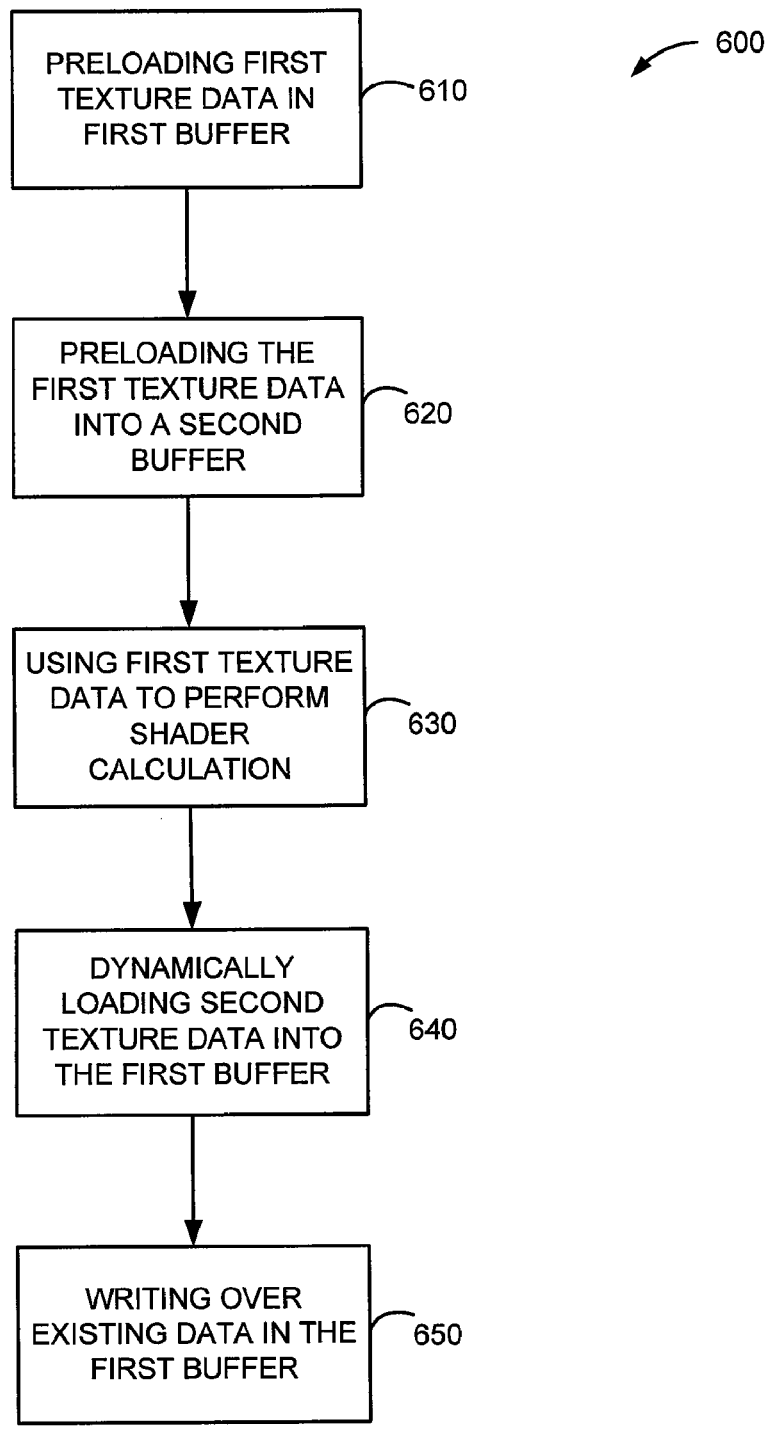
FIG. 13 is a block diagram illustrating an alternative embodiment of a method of managing texture descriptor data.

Reference is now made to FIG. 13, which is a block diagram illustrating an alternative embodiment of a method of managing texture data. The method 600 includes preloading first texture descriptor data from system memory in a first L1 buffer in block 610. The first texture data can be texture descriptors, which include information about texture, size, etc. The method 600 also includes preloading the first texture descriptor data into a second L2 buffer in block 620. The second L2 buffer can also be configured to receive and store data that is not related to texture processing. For example, data related to other shader functions can be stored in the second L2 buffer. The preloaded texture descriptor data in L2 corresponds to graphics elements that have not been processed in the first logic block. In block 630, the first texture descriptor data is used for texture data fetch and to perform a shader calculation. When utilizing the preloaded texture data, the shader calculation is performed without suffering the latency associated with retrieving data from a memory location. The method 600 also includes dynamically loading second texture descriptor data into the first L1 buffer in block 640. Dynamic loading occurs when the first logic block requires texture descriptor data that is not stored in the L1 buffer. The second texture data is generated by processing a dependent read request for texture service. This can include fetching texture descriptors from the L2 buffer or, in some cases, memory. The result of the processed dependent read texture descriptor request is written into the first L1 buffer. When the first L1 buffer lacks the capacity to receive the second texture data, existing data in the first L1 buffer is written over in block 650. A least recently used scheme can be utilized to determine which of the existing data in the first L1 buffer will be written over by the second texture data.

Embodiments of the present disclosure can be implemented in hardware, software, firmware, or a combination thereof. Some embodiments can be implemented in software or firmware that is stored in a memory and that is executed by a suitable instruction execution system. If implemented in hardware, an alternative embodiment can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any illustrated embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

At least the following is claimed:

1. A method for managing texture data, comprising:
   preloading a first plurality of texture descriptor values from a memory location into a first buffer located in a first logic block in response to a read request, wherein the first buffer is configured to receive data in the first logic block;
   preloading the first plurality of texture descriptor values from a memory location into a second buffer in a second logic block;
   utilizing the first plurality of texture descriptor values, within the second logic block, to perform a shader calculation;
   loading, dynamically, a second plurality of texture descriptor values from memory into the first buffer in response to the first logic block requiring additional data;
   writing the second plurality of texture descriptor values over a portion of the first plurality of texture descriptor values in response to the first buffer being full;
   maintaining a texture descriptor address value in a texture descriptor address buffer; wherein the texture descriptor address value comprises a combination of the following:
   a shader type field, configured to store a value indicating shader type;
   a context quantity field, configured to store a value indicating the quantity of contexts being processed in the second logic block;
   a group identification field, configured to store a value indicating which of a plurality of groups the texture descriptor is in; and
   a texture descriptor base address value.

2. The method of claim 1, further comprising identifying the portion of the first plurality of texture descriptor values to be overwritten based on a least-recently-used algorithm.

3. The method of claim 1, further comprising receiving a preload command from a texture address logic block into the second logic block.

4. The method of claim 1, wherein the first logic block is a texture processing block and the second logic block is a shader processing block.

5. The method of claim 1, wherein the first plurality of texture descriptor values comprise a plurality of identification data values corresponding to texture descriptors.

6. The method of claim 1, wherein the preloading into the second buffer comprises determining a data requirement in the second logic block for future operations by previewing pixels in earlier pipeline stages.

7. The method of claim 1, further comprising dividing the second plurality of texture descriptor values into a plurality of groups configured to be fetched by the second buffer.

8. The method of claim 1, wherein the texture descriptor base address value comprises a combination of the following:
   a valid bit configured to indicate whether the texture descriptor is valid;
   a texture descriptor group virtual address; and
   a texture descriptor starting number, configured to identify one of the plurality of lines in a group.

9. The method of claim 1, wherein the loading, dynamically, comprises loading when the first logic block requires texture descriptor data that is not stored in the first or second buffer.

* * * * *